(12) United States Patent
Geigel

(10) Patent No.: US 12,462,195 B2
(45) Date of Patent: Nov. 4, 2025

(54) SYSTEM AND METHOD OF PROVIDING CORRECTION ASSISTANCE ON MACHINE LEARNING WORKFLOW PREDICTIONS

(71) Applicant: Arturo Geigel, San Juan, PR (US)

(72) Inventor: Arturo Geigel, San Juan, PR (US)

(*) Notice: Subject to any disclaimer, the term of this patent is extended or adjusted under 35 U.S.C. 154(b) by 0 days.

(21) Appl. No.: 18/439,277

(22) Filed: Feb. 12, 2024

(65) Prior Publication Data

US 2024/0249195 A1 Jul. 25, 2024

Related U.S. Application Data

(62) Division of application No. 17/137,714, filed on Dec. 30, 2020.

(51) Int. Cl.
 *G06N 20/00* (2019.01)

(52) U.S. Cl.
 CPC .................... *G06N 20/00* (2019.01)

(58) Field of Classification Search
 CPC .............................. G06N 20/00; G06F 11/3604
 See application file for complete search history.

(56) References Cited

U.S. PATENT DOCUMENTS

| | | | |
|---|---|---|---|
| 6,606,613 B1 * | 8/2003 | Altschuler | G06Q 10/10 707/999.006 |
| 8,954,850 B2 * | 2/2015 | Gschwind | G06Q 10/10 715/764 |
| 9,158,585 B2 * | 10/2015 | Aharoni | G06F 9/50 |

* cited by examiner

*Primary Examiner* — David R Vincent
(74) *Attorney, Agent, or Firm* — Luis Figarella

(57) ABSTRACT

A system and method of for providing assistance to complete machine learning on workflow engines that deal with machine learning flows comprising operators configured in a coordinate grid. The process analyzes the positions and composition of operators, branches, inconsistencies, collisions and redundancy in the workflow in order to suggest to the user which changes should be made to the workflow.

3 Claims, 18 Drawing Sheets

| Operator | Operator ID | Operation | Operation ID |
|---|---|---|---|
| ☐ | 2 | Database connector | 1 |
| ☐ | 5 | Join Data Paths | 2 |
| ☐ | 4 | Split Data Paths | 3 |
| ☐ | 1 | Supervised Learning Operation | 4 |
| ☐ | 1 | Clustering Operation | 5 |
| ☐ | 1 | Sort Rows Operation | 6 |
| ☐ | 1 | Database connector to save Data | 7 |

Figure 5

SYSTEM AND METHOD OF PROVIDING CORRECTION ASSISTANCE ON MACHINE LEARNING WORKFLOW PREDICTIONS

CROSS-REFERENCE TO RELATED APPLICATIONS

This application is a divisional of co-pending U.S. Non-provisional application Ser. No. 17/137,714 titled "System and method of providing correction assistance on machine learning workflow predictions, filed on Dec. 30, 2020, the disclosure of which is herein incorporated by reference in its entirety.

BACKGROUND OF THE INVENTION

Field of the Invention

The present disclosure is directed to a system and method for providing assistance to complete machine learning on workflow engines that deal with machine learning flows.

Discussion of the Background

Current trends in machine learning are advancing at a rapid pace. As they become mainstream, machine learning implementations will shift focus from single module implementations or two to three modules to a complex web where dozens of machine learning algorithms alongside ETL operations are carried out. The complexity of this web on which multiple machine learning algorithms and ETL processes interact will strain the cognitive limitations of their creators. Some of these issues are already is being documented in other similar scenarios such as the one in Gallotti, Porter, and Barthelemy.

The disclosure describes improvements on the prediction of machine learning workflows that is done with information from previous workflows by incorporating existing data and determining whether the predicted model fits with the data under consideration. This problem is far from trivial where one of the main problems is that of column data state synchronization. In a multi-branch process a branch the data type may be changed before a second branch. Under some cases the second branch assumes in its operation that the data has the original data type or other attribute and operates on the wrong type of data. For example, a column that has been loaded as float is changed to string to store in a ASCII file but at the same time a second branch with longer processing time performs a normalization operation assuming a float data type but encounters that the data was changed from a float to a string. The timing based on multiple attributes of the data and the algorithms that are executed on each branch come into consideration. The current disclosure provides a process to detect this kinds of errors during the prediction process and does not wait until run time errors do occur.

A further problem during forecasting is assuming that the flows will automatically fit the new data that the predicted flow will be exposed. During the process of predicting a flow to carry out a process a data mismatch can occur. This means that there can be insertions of redundant and unnecessary flows. For example data type transformations when already the data is in the correct data type. For example, the data assumes a string to float operation but the data has already been converted to float. An additional example is a sort operation when the data is already sorted. Both examples point to redundant operations based on the nature of the data for which the predicted workflow has to account for.

DESCRIPTION AND SHORTCOMINGS OF THE PRIOR ART

While application platforms can offer some level of abstraction by providing graphical user interfaces, hiding the complexity of programming languages, there is still a cognitive overload possibility due to complex workflows that can be developed to manage complex data processing tasks.

U.S. Pat. No. 6,606,613 (the "'613 patent") B1 describes task models to help users complete tasks. This prior art has several shortcomings which are outlined as follows. First, the '613 patent models a single user's tasks whereas the present disclosure aims at parallel processes of tasks which present a different solving paradigm. Second, the clustering used in the '613 patent of similar tasks is based on agglomerative hierarchical clustering and this works for segregating tasks based on intersections and the difference between graphs.

The problem that the present disclosure aims to solve is how to cluster the machine learning workflows not on merely graph properties but also properties of the workflow itself. Properties such as the type of operation and its adjacent operators play a crucial role in establishing a processing pipeline that describes segments of the workflow. The properties that are crucial for proper segregation of the workflows require that each segment of the workflow be described by the operation being done, the algorithm used, the type of data being processed, and the underlying processing infrastructure in a parallel environment. Each of these properties can be further broken down according to processing speed, algorithm complexity, particular operation optimization, etc. These elements are essential in describing each node of processing in a parallel environment which are separate from the graph itself. Further, the graph itself is not a useful concept in parallel operation due to timing issue that might make a difference in processing. Such shortcomings are overcome in the present disclosure by embedding the graph in a coordinate system which can be fitted according to the requirements of comparison.

U.S. Pat. No. 8,954,850 (the '850 patent") uses agglomerative clustering to assist the user in building a workflow. The objective of this prior art is to detect similar patterns of construction of a flow in terms of the nodes under each branch of the business process. The limitation of this approach is that objects classified within a branch are not treated as sequentially dependent. Such data is indispensable to describe time dependent and operation dependent flows.

Providing appropriate contextual information beyond the graph structure is essential to any accurate matching of workflows, which the prior art does not provide. Contextual information that is not present in the prior art that can be used as properties of the workflow are their appropriate position with regards to other elements, where they are going to be executed, whether multiple flows share the same sequential information and in what order and patterns of multiple operators in a sequence. Discriminating among sequences into different branches of the clusters is also not present in the prior art. All these shortcomings limit the prior art on the degree of accuracy of the automation that can be produced by such methods.

While the prior art such as U.S. Pat. No. 9,158,585B2 tries to correct flows by designing interfaces among blocks such that a data-producing block generates the data in the same format as required by a block which receives the information. While this is a viable solution to correct the coupling between programming blocks it has several shortcomings. The first shortcoming is that the validation takes place only at the coupling and not at the flow level. The second shortcoming is that the flow is not validated to see if the block is redundant. That is it is not leverage previous similar flows to try to determine if the block is necessary or repeated. While previous art such as US6606613B1 does leverage previous information to guide the user it faces several problems. The first one is that it does not address the timing problem during task assignments. The second is that the flows are not validated for insertions deletions or transpositions during the analysis and how does the data affect these mismatches with the predicted model.

BRIEF DESCRIPTION OF THE DRAWINGS

FIG. 5 shows a database table of a particular implementation of operator types alongside identifying fields according to the teachings of the present invention.

DETAILED DESCRIPTION OF THE PREFERRED EMBODIMENTS

Figure 1:
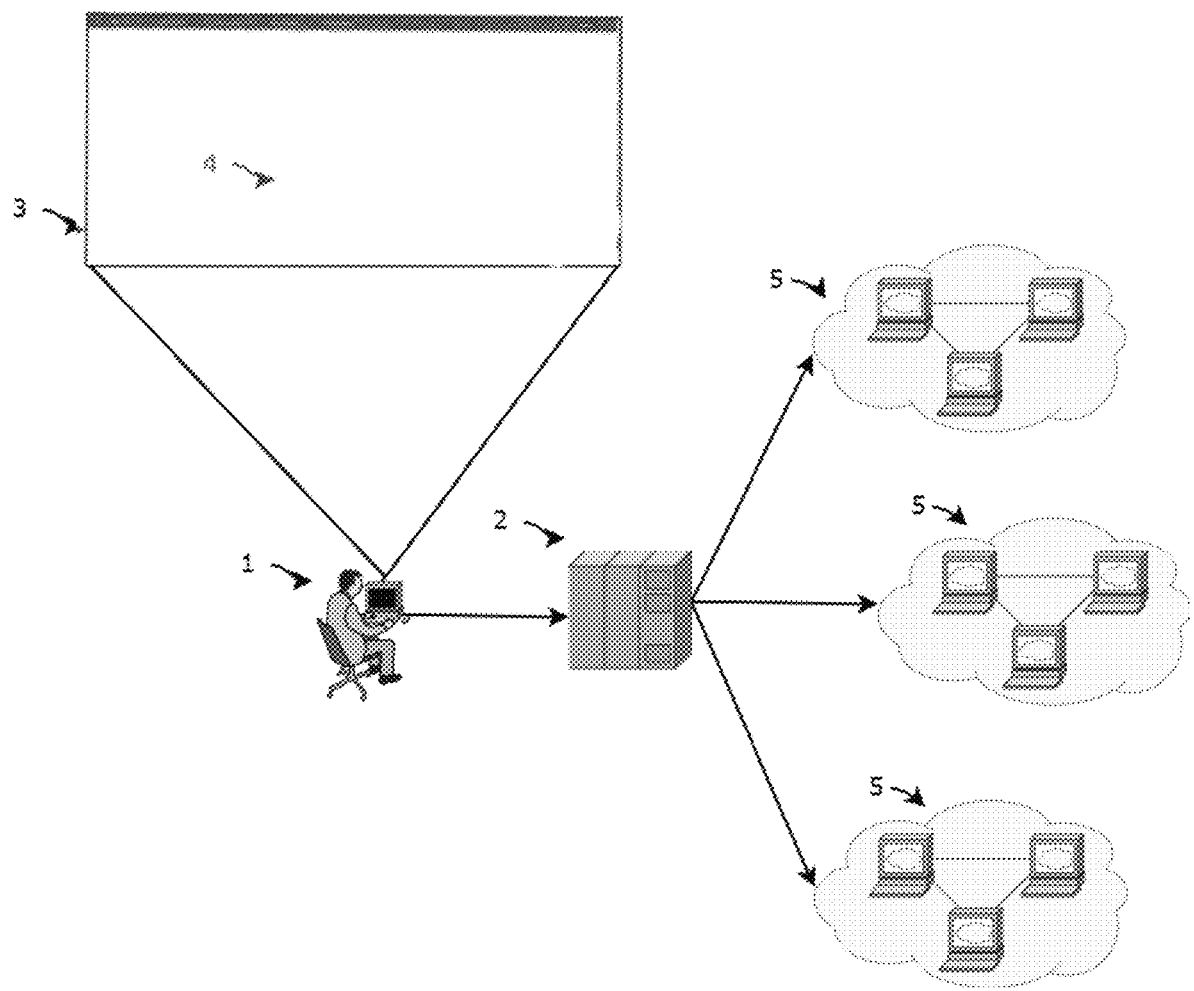
FIG. 1 shows a typical embodiment of a system that performs the functions of making machine learning workflows according to the teachings of the present invention.

FIG. 1 Shows a typical embodiment of a system that performs the functions of making machine learning workflows. The system is accessed by a user through a terminal 1. The terminal 1 is connected to a central processing system 2 that contains memory components and processing units. The terminal accesses the functionality of the of the central processing system via an interface system 3 that has functionality icon 4. The central processing system 2 will process the information given by the interface system 3 and a functionality icon 4 to the terminal systems CPU and memory system or to a distributed architecture 5.

Figure 2:
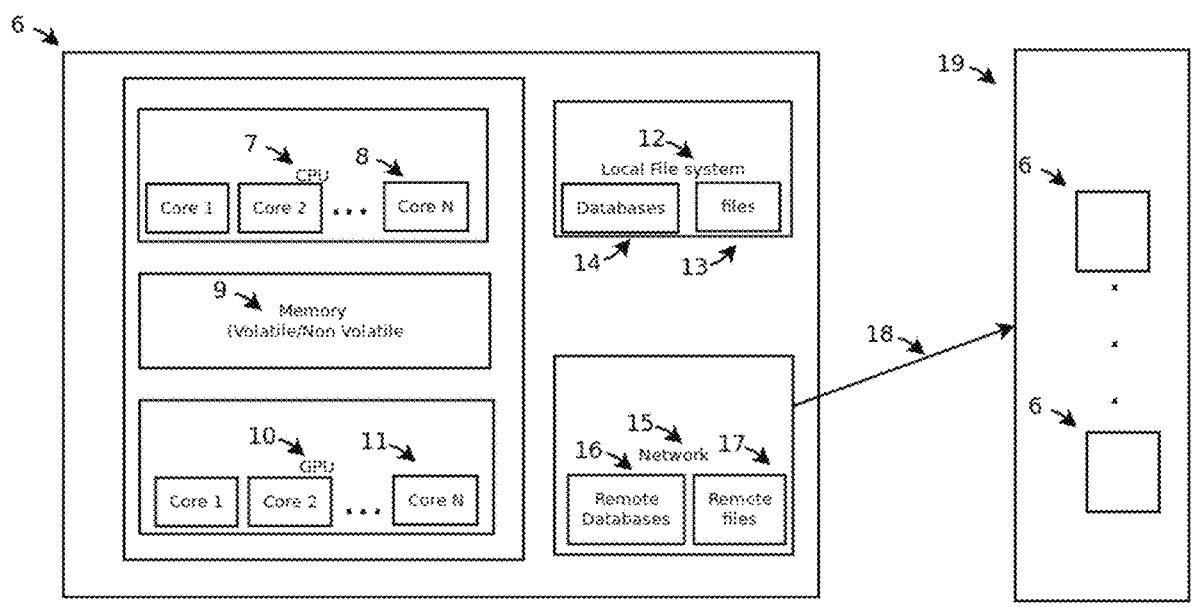
FIG. 2 describes the physical layout of the typical execution environment on which the parallel execution will take place according to the teachings of the present invention.

FIG. 2 describes an example of the physical layout of the typical execution environment on which the parallel execution takes place. A typical embodiment consists of a computer system 6 that contains a CPU 7 with a number of N cores 8. The N cores 8 are capable of doing multi-threading tasks on the CPU 7. The computer system 6 also contains a memory system capable of storing information for processing by the CPU 7. The computer system 6 can also contain a compute capable GPU 10 with a number of N cores 11. Computer system 6 has a local file system 12 that can contain several files 13 and possibly a database system 14. Computer system 6 includes a network interface 15 that can access a remote database system 16 or a remote file system 17. Access to remote database system 16 and/or a remote file system 17 is done through a network card in network 15 via a connection 18 to a cloud infrastructure 19. The cloud infrastructure 19 contains up to n computer systems 6.

Figure 3:
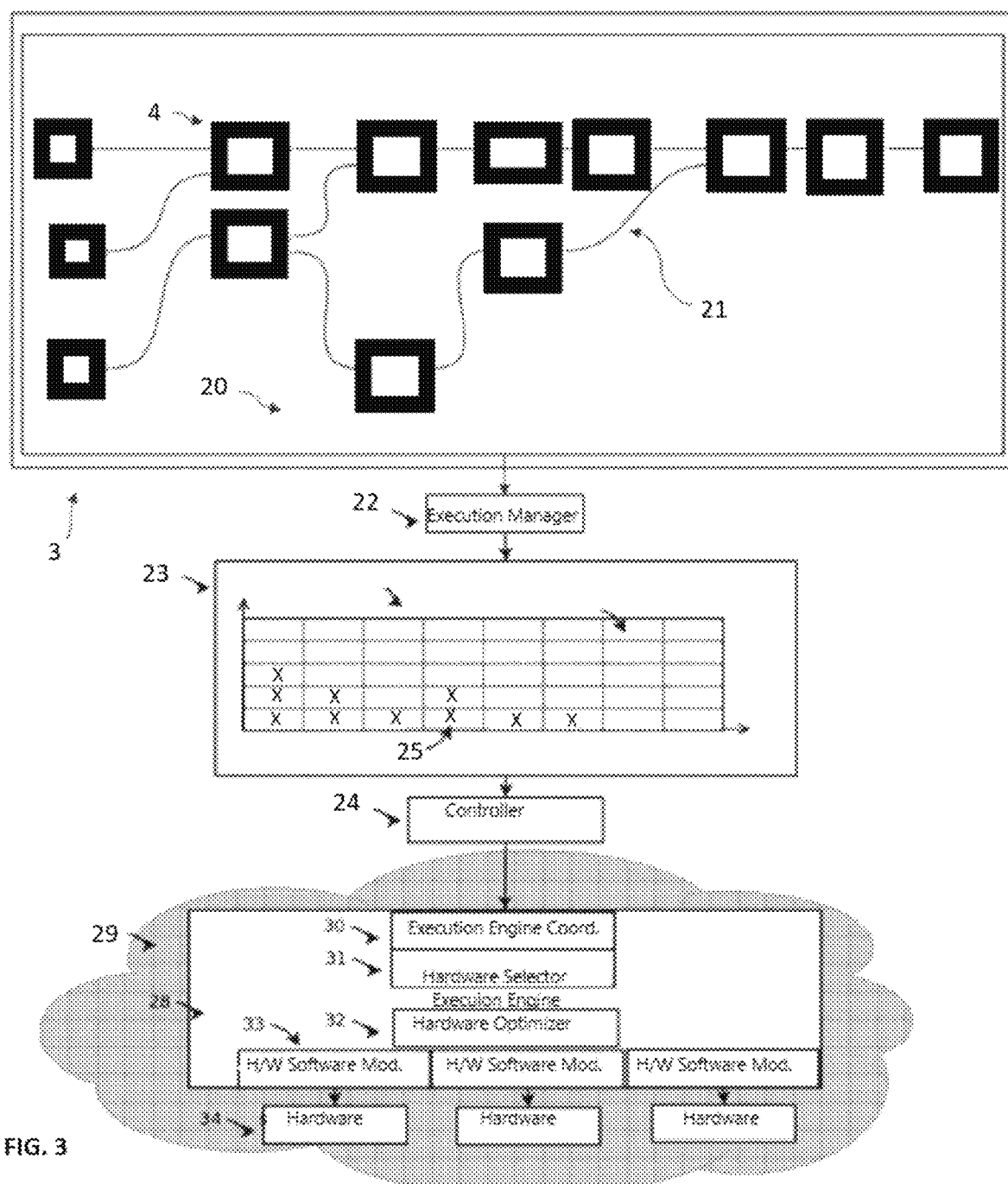
FIG. 3 displays a graphical representation of the major components of an exemplary system that can perform the functions of making machine learning workflows according to the teachings of the present invention.

FIG. 3 Displays a graphical representation of the major components of an exemplary system that can perform the functions for making machine learning workflows. The system starts with the interface system 3 that has functionality icon 4, which contains the configuration that the system will execute. An execution program 20 is specified by the functionality icon 4 connected via a link 21. Once the execution program 20 is finished the program will be forwarded to an execution manager 22. The execution manager 22 will reside on the central processing system 2 which is a typical computer system 6. The execution manager will produce an execution map 23 based on the execution program 20. The execution map 23 contains an execution matrix 24 that will store the order of the execution. Each entry in the execution matrix 24 is assigned an execution slot 25 that can be filled with an execution entry 26 that corresponds to functionality icon 4.

Once the execution map 23 is completed it is passed to a controller 27 that also resides central processing system 2. The controller coordinates the execution with an execution engine 28 across the cloud environment 29. Cloud environment 29 is composed of cloud infrastructure 19 that contains up ton computer systems 6. The controller 27 communicates to an execution engine coordinator 30 that resides on one of n computer systems 6 of cloud environment 29. The execution engine coordinator 30 uses a hardware selector 31 to discriminate which component of computer systems 6 should be used. For example, hardware selector 31 can choose between execution between the N cores 8 on the CPU 7 or use GPU 10 or other processing technology. Once hardware selector 31 chooses the particular processing technology, the hardware selector 31 selects a hardware optimizer 32 which coordinates with a hardware software module 33 that contains the necessary routines to interact with hardware 34.

Figure 3A:
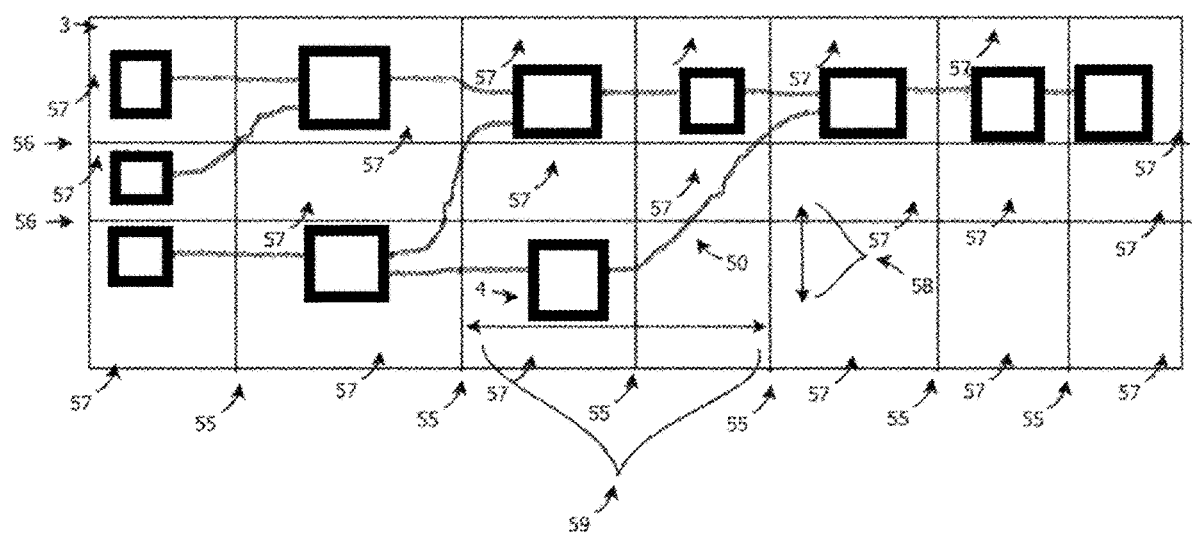
FIG. 3a shows a segmentation of a workflow configured in a coordinate grid in accordance with the principles of the present invention.

FIG. 3a shows a workflow configured in a coordinate grid for execution 22. The plurality of functionality icons 4 and link connectors 51 are segmented via a vertical line 55 and a horizontal line 56 into a cell 57. Empty cells can create a vertical slack 58 or a horizontal slack 59 in the coordinate grid that will be used by the controller 27.

Figure 4:
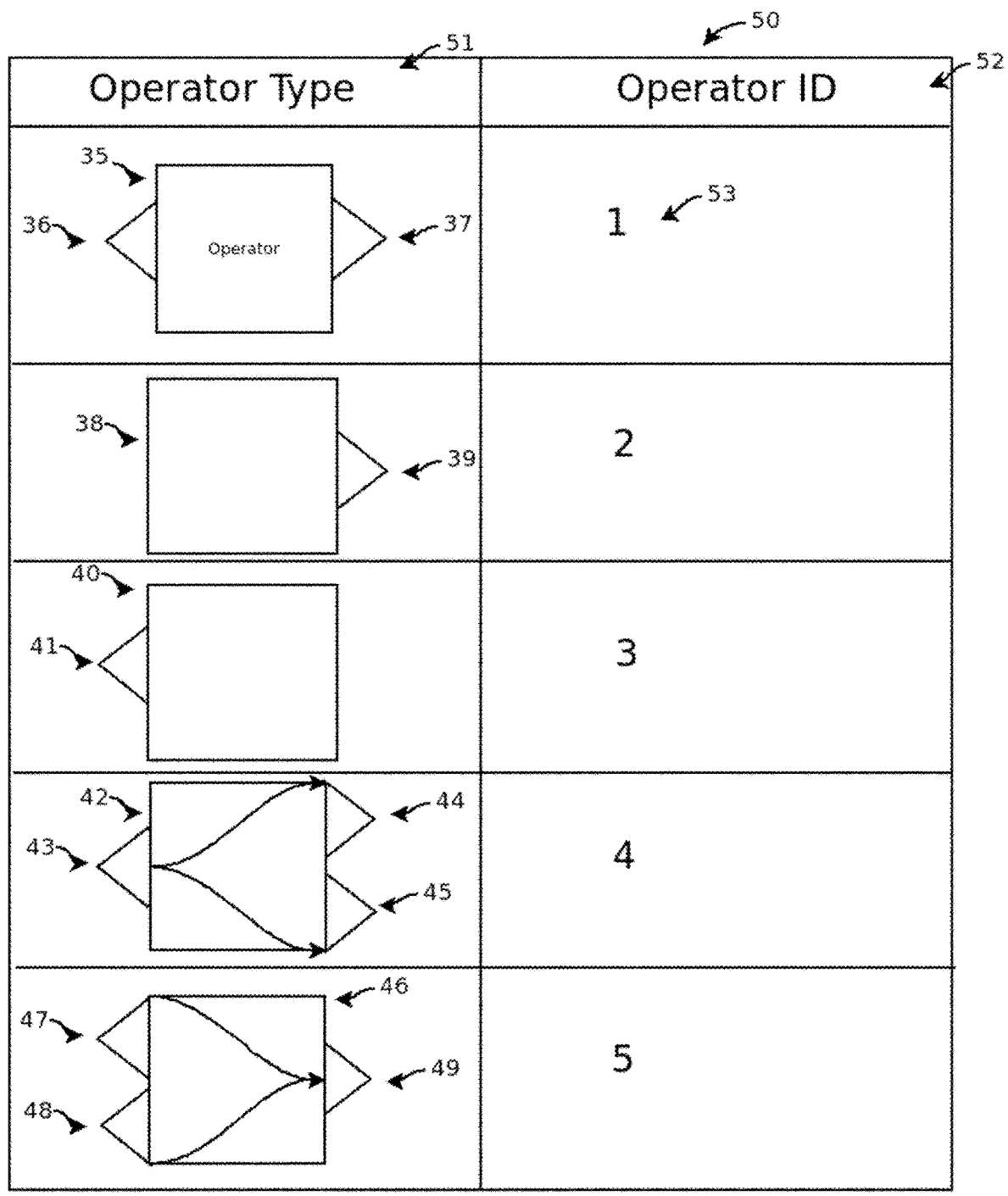
FIG. 4 shows the categories of graphical operator elements according to the teachings of the present invention.

FIG. 4 shows the categories of graphical operator elements. Functionality icon 4 of interface system 3 can be divided into several icon types with specific functions that are independent of the particularity of the operations they are required to perform. FIG. 4 shows an operator 35 that has an input link connector 36 and an output link connector 37. The operator 35 represents an operation that has one input and one output. For example, this may represent a single instruction single datum (SISD) or single instruction multiple data operation (SIMD). An operator 38 contains an output link connector 39 representing a source operation. A source operation can be usually be taken but not limited to data extraction from a source that can be a database, file, web service, or other similar operation that does not accept an input to the operator.

An operator 40 contains an input link connector 41 representing a destination operation. A destination operation can be usually be taken but not limited to data storage such as insertion to a database, file, web service or other operation that only accepts an input to the operator. An operator 42 represents a split operation. The operator 42 has an input link connector 43 that represents the input to the system. The operator 42 also contains an output link connector 44 and an output link connector 45. The split operation done by operator 42 takes one input through input link connector 43 and performs a split of the data into separate streams that are redirected to output link connector 44 and output link connector 45. Finally, an operator 46 represents a join operation. The operator 46 has an input link connector 47 and an input link connector 48. The operator 46 also contains an output link connector 49. The join operation carried out by operator 46 takes two data streams through input link connector 47 and input link connector 48 and joining the data stream into a single output that is sent to output link connector 48. The type of joining of data of operator 42 and splitting of data by operator 46 is independent of the operator type. A database table 50 can store the categories represented in operators 35, 38, 40, 42, 46 in a column 51 and have an operator ID column 52 storing an ID 53 that will be used to identify particular implementations of operators 35, 38, 40, 42, 46.

FIG. 5 shows a database table of an exemplary implementation of operator types alongside identifying fields. A database table 54 holds an operator field 55 that holds an operator 56. The operator 56 is given its diagrammatic form via functionality icon 4. The operator 56 is described by an operation field 57 that provides a description of what the operator does. The operator 56 is associated via database table 64 to operator ID column 52 of database table 50 via an operation ID field 58 thereby linking a particular operator with its type.

Figure 6:
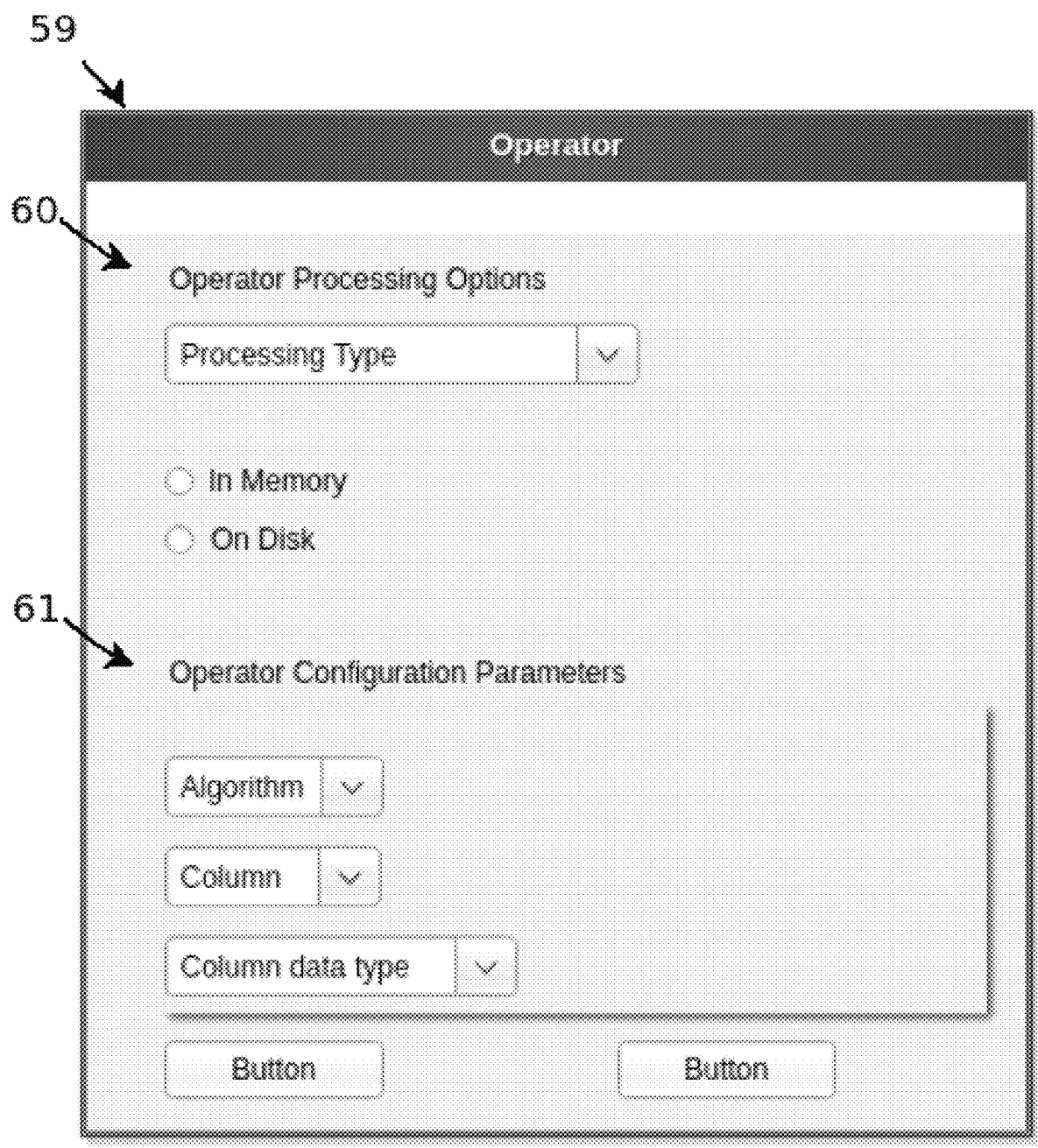
FIG. 6 shows an example of general fields that make up the configuration parameters of an operator according to the teachings of the present invention.

FIG. 6 shows an example of general fields that make up the configuration parameters of an operator. The operator 56 accessed on interface system 3 via functionality icon 4 which will then present a configuration window 59. The configuration window can have multiple configuration parameters. Such parameters can be divided into an operator processing options 60 and operator configuration parameters 61. Operator processing options 60 depend on the particular hardware options of terminal 1, the central processing system 2 and distributed architecture 5. Operator processing options 60 depend on the type of process or algorithm implemented and the data characteristics on which the operator will act upon.

Figure 7:
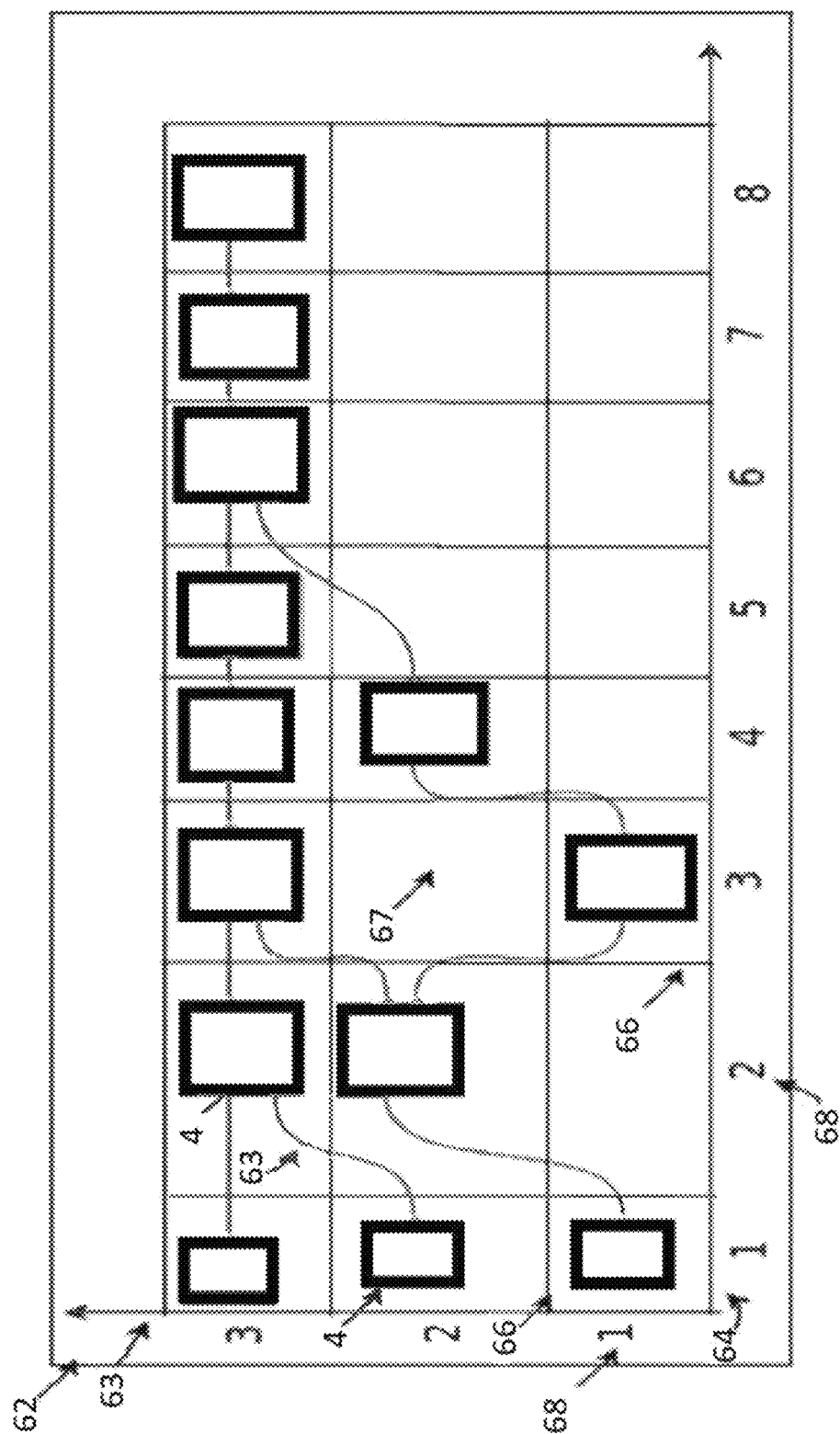
FIG. 7 Shows an execution map representative of a machine learning workflow divided into a grid where operators can be identified within a particular workflow according to the teachings of the present invention.

FIG. 7 shows an execution map representative of a machine learning workflow divided into a grid where operators can be identified within a particular workflow. A machine learning workflow 62 is representative of a typical machine learning flow. The flow is composed of functionality icons 4 which are joined by a workflow line 63. The machine learning workflow 62 can be put into a context of a grid by adding an x-grid line 64 and any-grid line 65. The x-grid line 64 and they-grid line 65 can each be divided by a line segments 66 that make up a square segment 67. Each segment 67 can then be identified by a number 68 on the x-grid line 64 and an y-grid line 65. The square segment 67 can be empty or populated by functionality icons 4. The functionality icon that is mapped to an operator 56 can give each square segment 67 a maximum number of line segments 66 depending on the description on database table 50 of operator 56. This particular implementation makes validation of the flow deterministic in nature.

Figure 8:
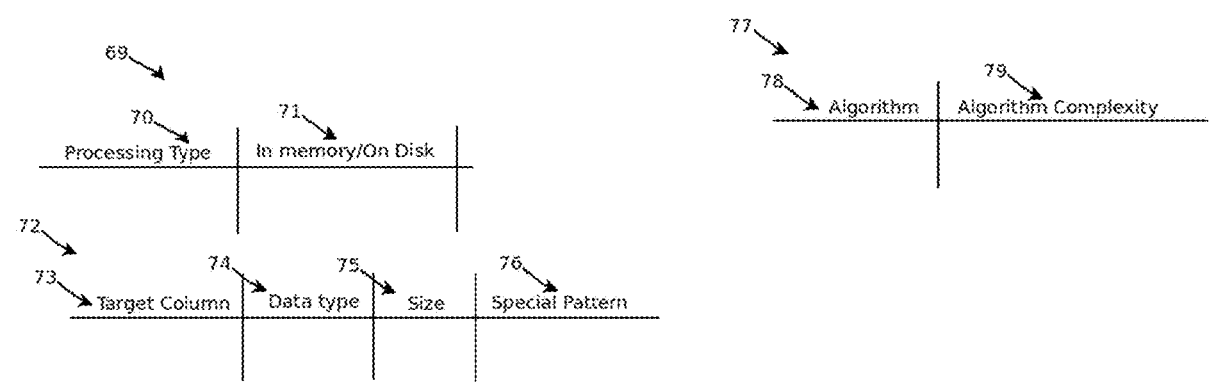
FIG. 8 shows a table representation of descriptive fields of the operators according to the teachings of the present invention.

FIG. 8 shows a table representation of descriptive fields of the operators. A database table 69 shows properties of the operator 56 configuration that is done in configuration window 59 of FIG. 6. Database table 69 contains fields that belong to the particular hardware configuration parameters of the operator 56 such as a processing type field 70 that indicates whether it is single processor, multi core execution, GPU, etc., and a field 71 for in memory/on disk execution type. A database table 72 contains data parameters on which the operator 56 will execute on. A database table 72 contains attributes that belong to the data on which the operator 56 has been implemented on. The table 72 contains a column 73 which contains the target column of a file that has a vector format where each column belongs to a vector component. Table 72 also contains a column 74 that specifies the data type of the target data column identified in column 73.

Column 73 can be represented as the column name, its position on the file, its identification number or a combination of fields or a composite of fields. Table 72 also contains a column 75 for the size of the data field. The size of the field can be interpreted as the number of characters of a string or the precision of a double precision number. The table 72 also contains a column 76 that holds particular patterns of the data such as those encoded by a regular expression or other such specification. A database table 77 contains information pertaining to the algorithm used in operator 56. The database table 77 contains information encoded in columns such as a table column 78 for the particular algorithm and a database table column 79 that specified the algorithm complexity of the particular algorithm implemented. This fields are not to be construed as the only fields to be included in database tables 69, 72 and 77 but as representative examples of each category of each respective table and the information to be stored in them.

Figure 9:
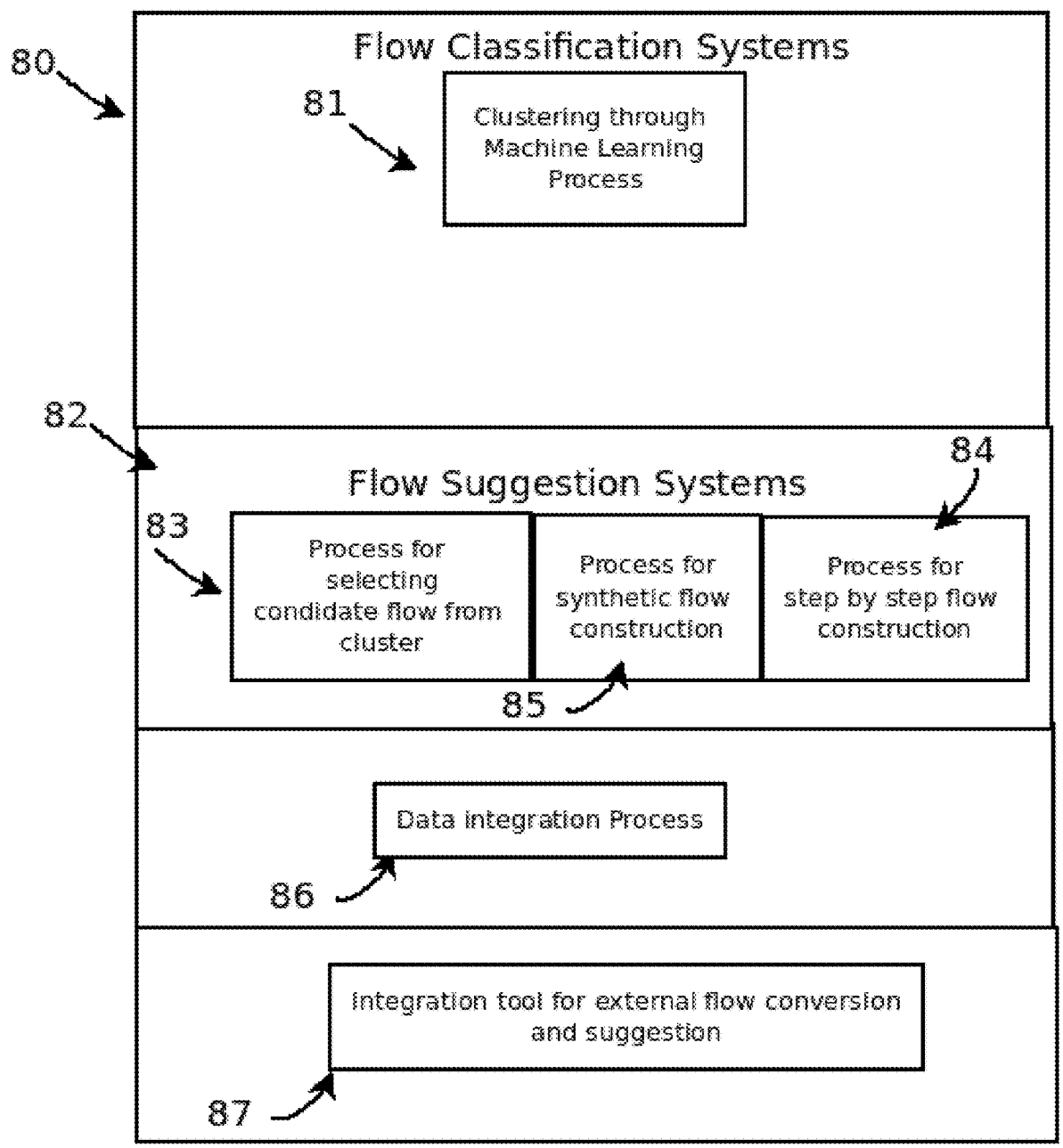
FIG. 9 describes the different components that make up a suggestion system according to the teachings of the present invention.

FIG. 9 describes the different components that make a suggestion system for classifying machine learning flows. A flow classification system 80 contains a subsystem 81 that implements clustering through machine learning processes. The flow classification process 80 also includes a subsystem 82 for machine learning workflow normalization and suggestion. The subsystem 82 of normalization flow suggestion system comprises of a subsystem 83 the enables the process of selecting a candidate flow from the clusters obtained in the classification process 80, a subsystem 84 of step-by-step construction of the machine learning workflow, and a subsystem 85 that does a synthetic workflow construction. This synthetic workflow does not select a candidate workflow but instead builds it completely based on the information available from the workflows in the cluster. The flow suggestion system also contains a subsystem 86 that can take the selected workflow from subsystem 83, subsystem 84, and subsystem 85 and checks and adjusts its workflow components according to the available data connections. The flow suggestion system further contains subsystem 87 for translation and integration with other similar applications.

Figure 10:
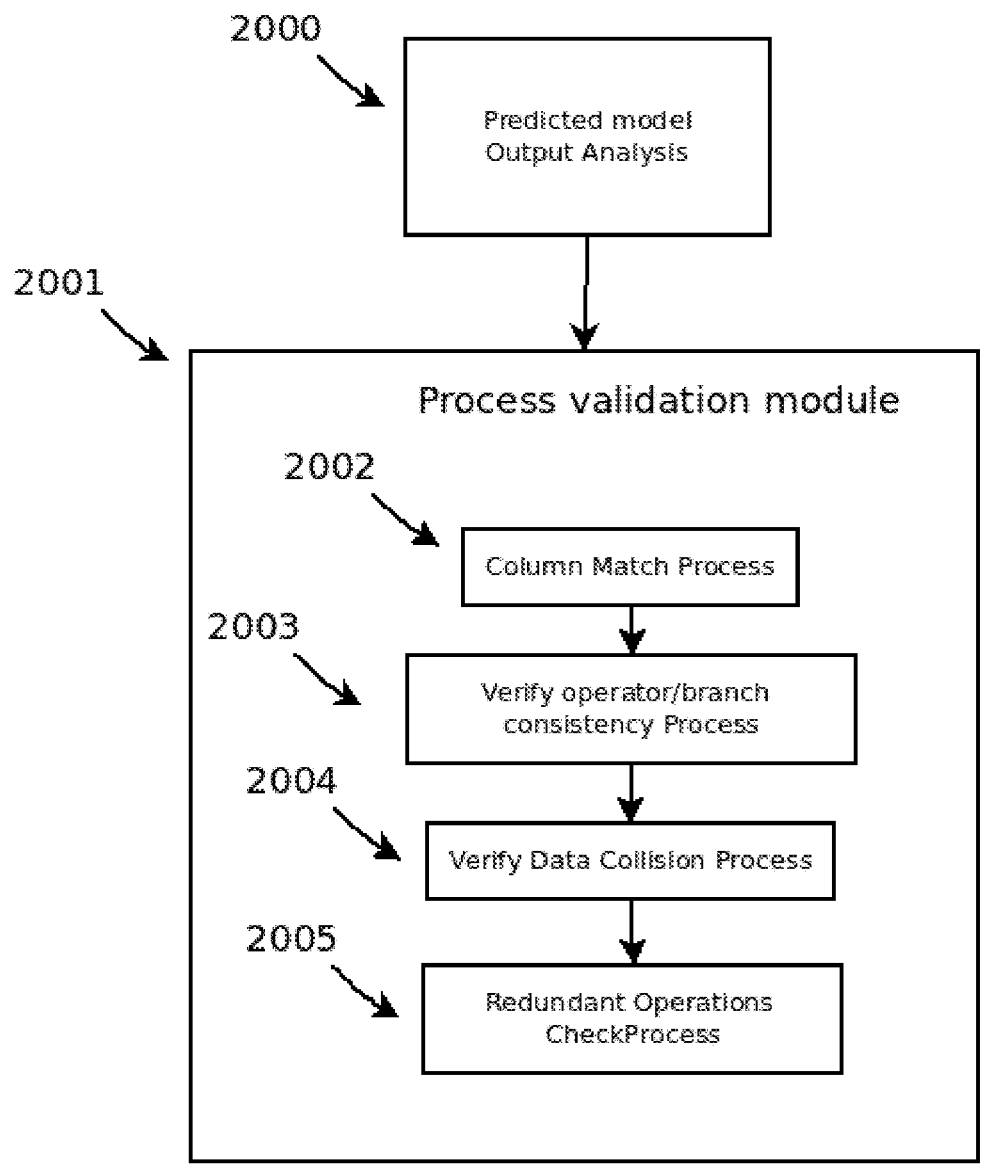
FIG. 10 shows the overall process of providing correction assistance on machine learning workflow predictions according to teachings of the present invention.

FIG. 10 shows the overall process of providing correction assistance on machine learning workflow predictions. The process starts with a process block 2000 that is the output of the analysis of a predicted model that is generated by subsystem 83, subsystem 84, or subsystem 85. A process diagram 2001 shows the sub modules of the process being disclosed. A step 2002 receives the predicted model of process block 2000 and carries out a column match process. A step 2003 follows step 2002 where the step carries out a process of verification of consistency of the branches of a workflow and the operators contained in them. A step 2004 follows with the verification and detection of data collisions on the flow. Finally, a step 2005 verifies redundant operations in the flow.

Figure 11:
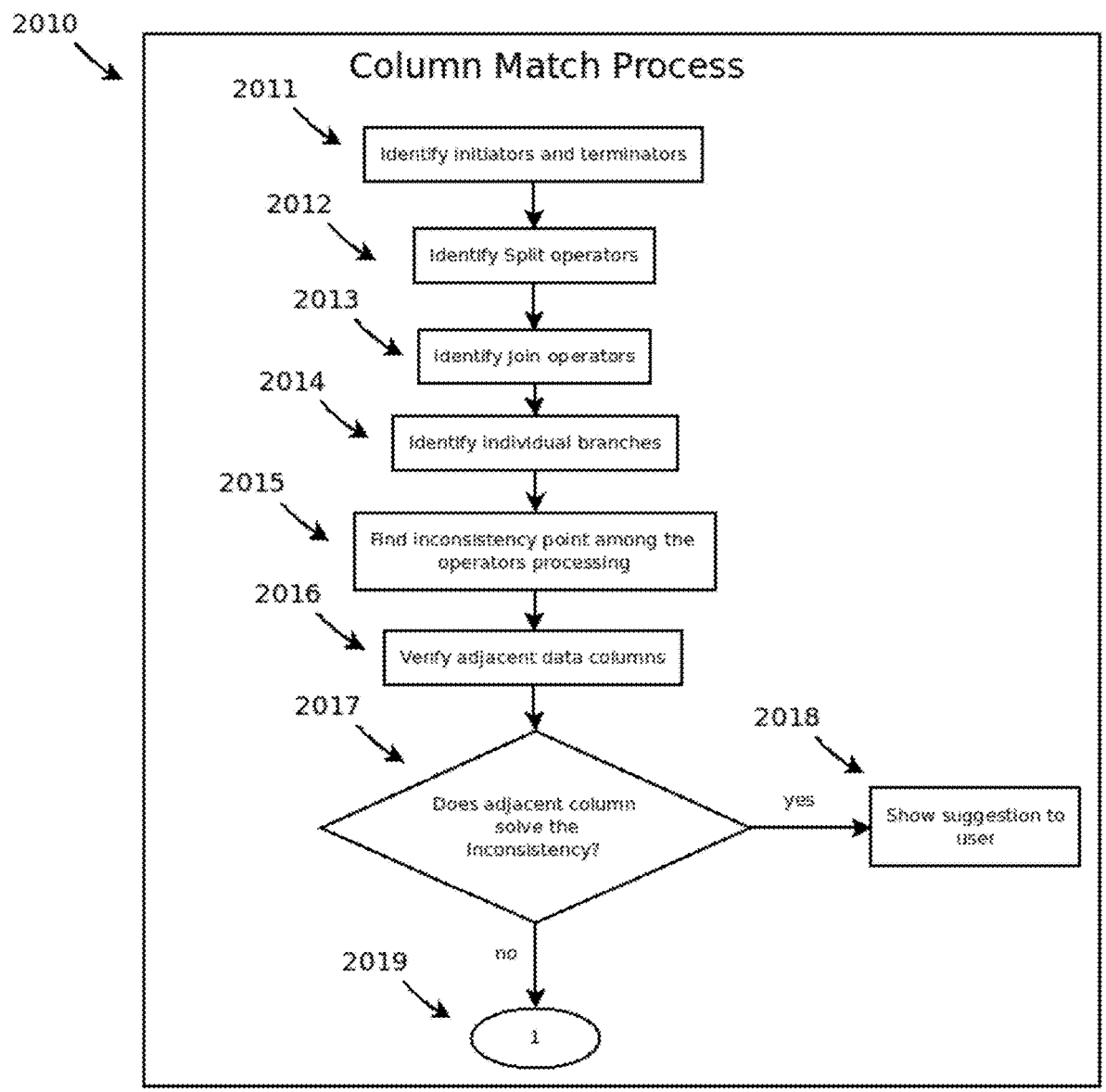
FIG. 11 shows the process of validating operations for correct column selections by a user according to the teachings of the present invention.

FIG. 11 depicts the process of validating operations for correct column selections by the user. A process 2010 is used to verify that the user is currently matching the correct column of a vector to its corresponding operation in the flow. The process 2010 starts with a step 2011 which identifies the operators that are initiators and terminators within a machine learning workflow. Once the endpoints of the workflow are identified a step 2012 identifies operators that function as a split or branching process. A step 2013 identifies the join operators that mark the ending points of a local branch. A step 2014 proceeds to match the split operator with its corresponding join operator to identify each local branch in the machine learning workflow.

A step 2015 proceeds to scan from the inner local branches outward to identify flow inconsistency points. The flow inconsistency points are mismatches between operator functionality and the data being manipulated. An example of an inconsistency might be but is not limited to doing multiple operations of splitting and joining string columns and then carrying out a mathematical operation on the strings that have no numeric values. A step 2016 will verify the vector for adjacent column values to verify if an adjacent column can satisfy the resolution of the inconsistency. A step 2017 makes the decision whether the adjacent column solves the inconsistency and if the decision is true proceeds to a step 2018 that shows the suggestion to the user. If step 2017 is negative a flowchart continuation symbol 2019 represents the transition from the column match process step 2002 to step 2003.

Figure 12:
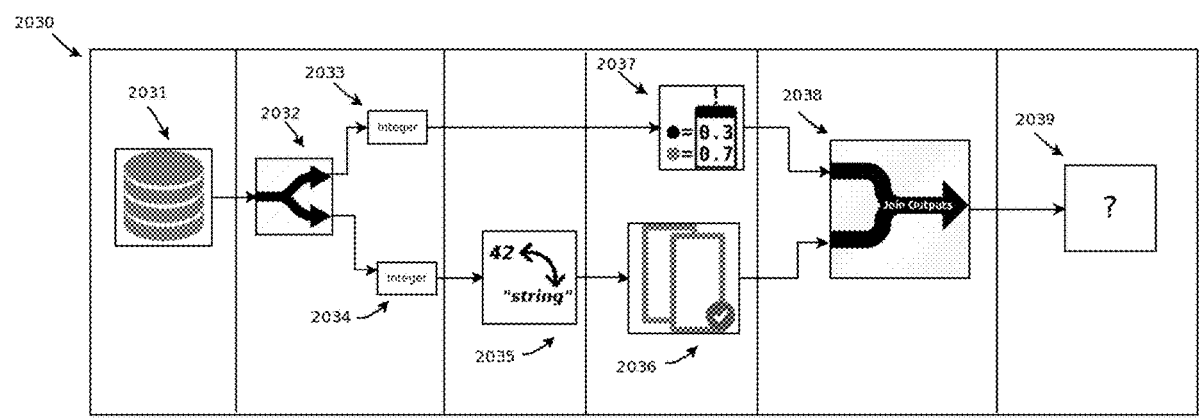
FIG. 12 shows an example of a workflow that has a branch consistency problem with regards to the rest of the workflow according to the teachings of the present invention.

FIG. 12 shows an example of a workflow that has a branch consistency problem with regards to the rest of the workflow. A workflow 2030 starts with a data upload process 2031 from a data source which is of type integer. A split operator 2032 creates a branch 2033 and a branch 2034 where both branches contain data of type integer. An operator 2035 does a data type conversion from integer to its string text equivalent while an operator 2036 performs an operation on the textual data. An operator 2037 performs a numerical operation on the integer data on branch 2033. When branches 2033 and 2034 reach an operator 2038 a conflict occurs because the nature of the data changed on branch 2034 but remained with the same data type on branch 2033 and copy to an additional column before operator 2035 was not carried out. The conflict will persist after the operator 2038 to an operator 2039 and subsequent operators. The example shown FIG. 12 is meant to show what a workflow with a branch that contains consistency problems may be, however, it shall not limit the scope of the present disclosure, as many different types of consistency problems in branches may exist.

Figure 13:
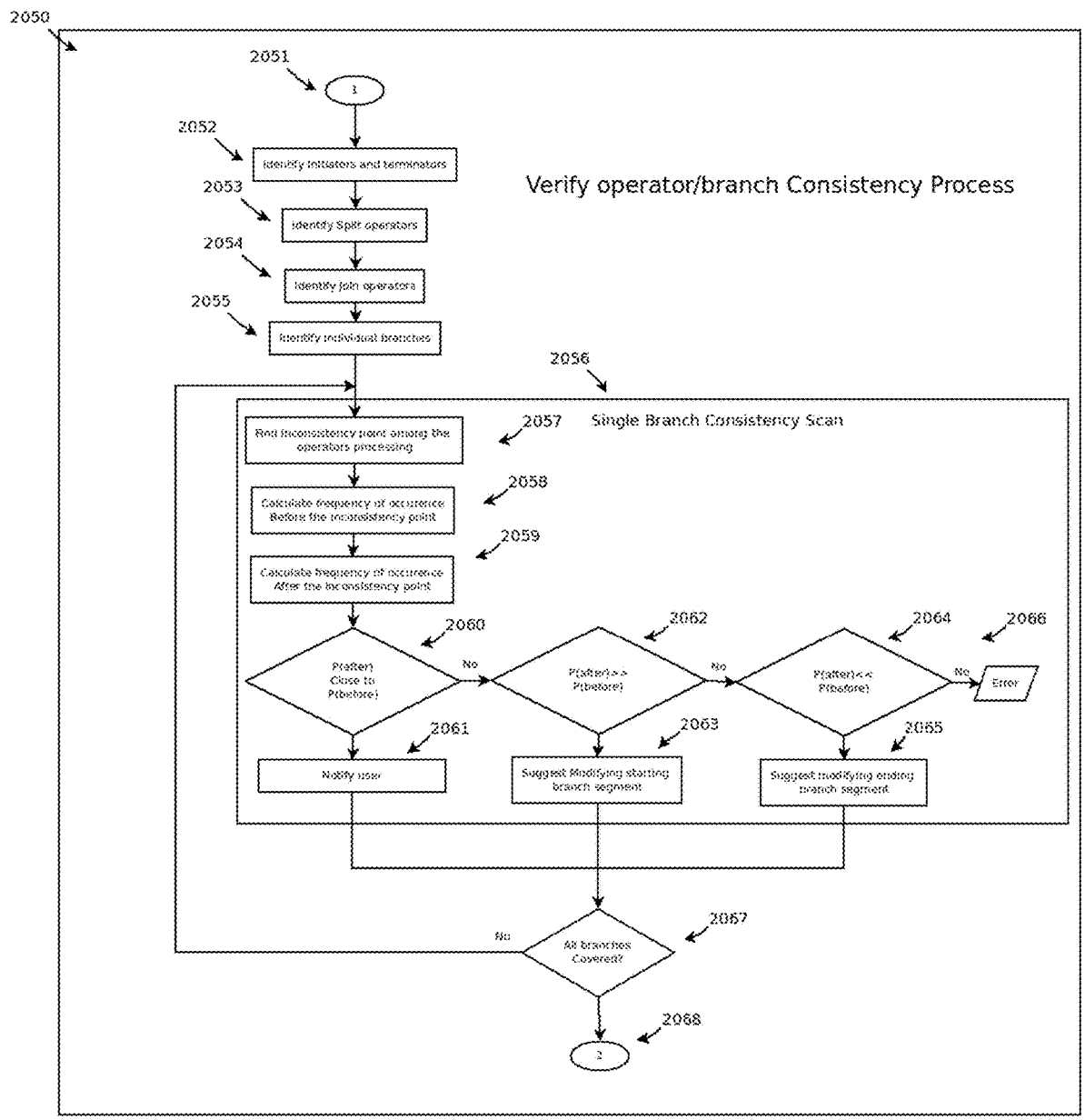
FIG. 13 shows the process to verify operator inconsistencies among themselves and verify branch inconsistencies according to the teachings of the present invention.

FIG. 13 presents a flowchart to verify operator inconsistencies among themselves and verify branch inconsistencies. A flowchart 2050 contains the details to carry out step 2003. Flowchart 2050 contains a flowchart continuation symbol 2051 that represents the transition from the column match process step 2002 that has flowchart continuation symbol 2019 to step 2003 represented by process 2010. Step 2051 is followed by a step 2052 that identifies all operators that are initiators and terminators of the workflow. A step 2053 identifies all split operators of the flow followed by a step 2054 that identifies the join operators in the workflow. Steps 2053 and step 2054 are utilized in a step 2055 to isolate individual branches based on matching the split operators to the join operators. After step 2055 is completed a composite step 2056 follows which consists of a single branch consistency test.

Step 2057 scans for consistency between operators in a single branch. The consistency process consists of operators that do not conflict in operations such as differing use of data types and operations that undo previous ones. A step 2058 calculates the frequency of occurrence before the inconsistency if detected, else it jumps to next branch. The frequency of occurrence will determine if data operated on previous operations matches and how many of them had the pertinent data types. For example, if four operators handled the data as integer and one as string, the computed frequency will be computed based on these occurrences. A step 2059 is complementary to step 2058 where step 2059 computes the forward frequency of occurrence in the same manner as step 2058. A step 2060 compares the results of step 2058 and 2059 and if the probabilities are relatively close to one another then a step 2061 notifies the user of the closeness. If the probabilities are not relatively close, then a step 2062 compares to see if the probability of step 2059 is much bigger than the probability of step 2058.

If the step 2062 is positive, then a step 2063 notifies the user and suggest modifying the starting segment of the branch. If the result is negative then, a step 2064. Step 2064 compares the to see if the probability of step 2059 is much smaller than the probability of step 2058. If the result of step 2064 is positive then a step 2065 notifies the user and suggests modifying the ending segment of the branch. If step 2064 is negative an error occurs in a step 2066. Step 2061, step 2063 and step 2065 proceed to a step 2067 that verifies if all branches are covered. If step 2067 is negative then the process goes to step 2057 to evaluate the next branch. If the step 2067 is positive then the process continues symbolized by the continuation symbol 2068.

Figure 14:
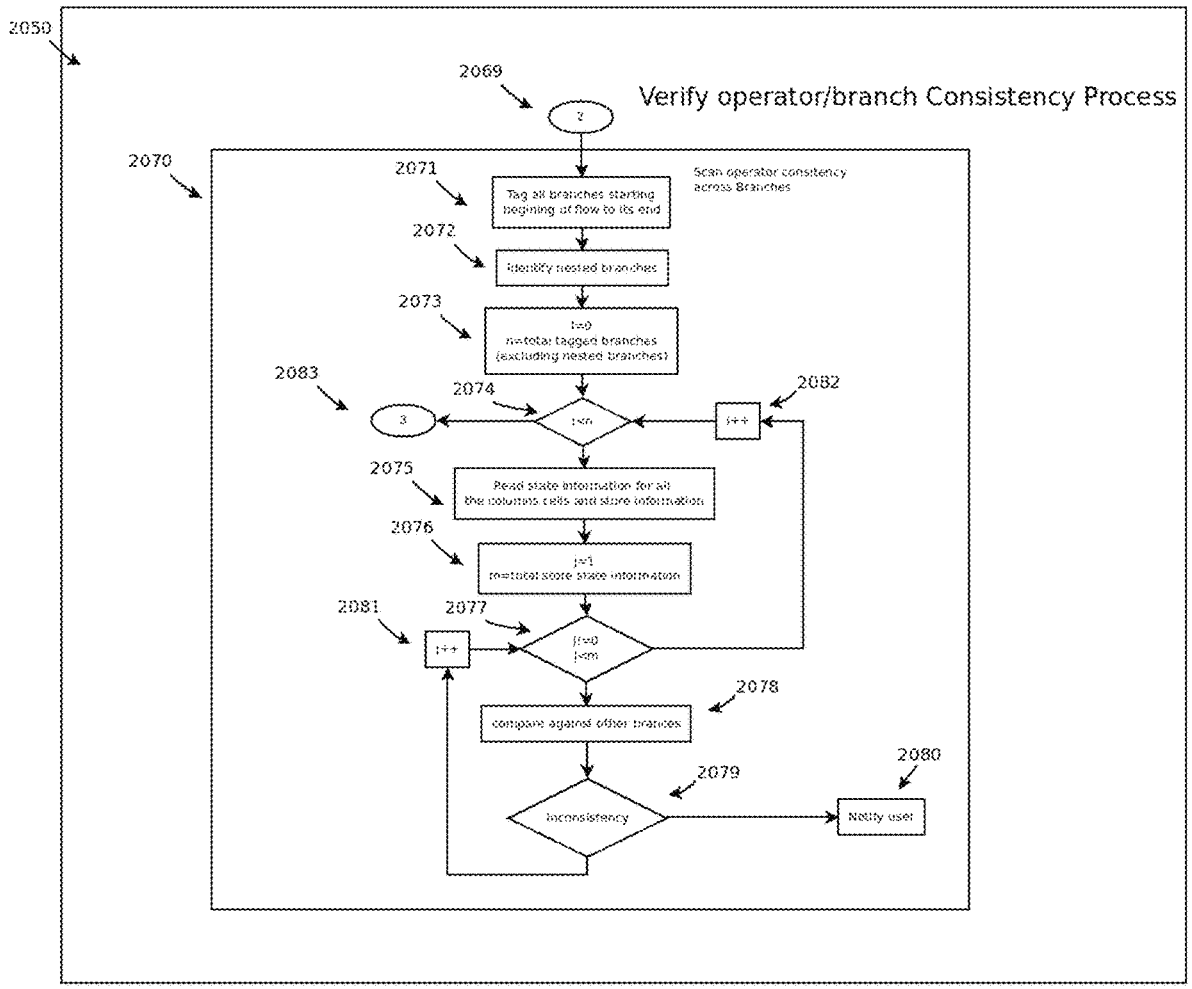
FIG. 14 shows the continuation of the process depicted in FIG. 13.

FIG. 14 presents the continuation of the flowchart to verify operator inconsistencies among themselves and verify branch inconsistencies. A continuation symbol 2069 is the counterpart of continuation symbol 2068 of the previous figure. The flowchart shows a block of steps 2070 that represents the transition from individual operators in branches to the consistency between branches of the workflow. A step 2071 identifies and tags all identified branches. A step 2072 identifies nested branches by considering split operators within branches. Alternatively, it may start from a branch and evaluates if the branch is nested inside another branch. A step 2073 prepares the counters for iteration and eliminates nested branches from the branches and treats them as separate entities.

A step 2074 compares the counter to the total number of branches if the counter is less than the total, a step 2075 takes place. Step 2075 reads all the information regarding the operators and the data being managed per execution matrix 24 and its assigned execution slot 25. A step 2076 initializes the counters that are used in the iterations that compare the currently stored information of a branch with previously stored branches. The iterations are carried out in a step 2077 and the comparisons between branches are carried out in a step 2078. The comparison is done through an inner loop where the current block within a branch is compared to elements in the same grid column or before to detect inconsistencies between branches as they occur with respect to the current branch.

The consistency process consists of operators that do not conflict in operations such as differing use of data types and operations that undo previous ones. A step 2078 decides if there is an inconsistency and if step 2079 is positive, it will notify the user in a step 2080. If the step 2079 is negative it will proceed to the next operator within the branch by increasing the counter in a step 2081. If step 2077 determines that each element of the branch has been evaluated, it will proceed to increment the counter in a step 2082 and proceed to the next branch. If step 2074 determines the process is finished it will proceed to the next step of the flow symbolized by the continuation symbol 2083. In an alternate embodiment within step 2073 an additional step for inconsistency comparison between branches is to set the process of dividing into comparison sets with the criteria that within each set there are branches that join at a specific point in the flow.

Figure 15:
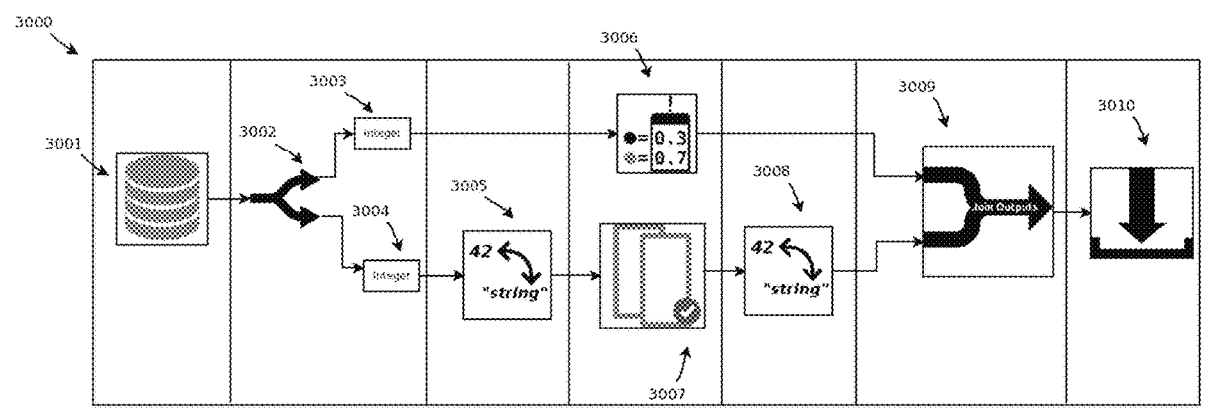
FIG. 15 shows a machine learning workflow with a synchronization problem according to the teachings of the present invention.

FIG. 15 displays a machine learning workflow with a synchronization problem. The figure shows a machine learning workflow 3000 that starts with a data extraction operator 3001. The data extraction operator is followed by a split operation operator 3002. The split operation operator 3002 divides the data into a branch 3003 and a branch 3004. Branch 3003 and branch 3004 have the data in the same state. Branch 3004 processes the data and changes it into a different data type through an operator 3005. An operator 3006 does a numeric operation and at the same time an operator 3007 is doing a different operation on the same data but under the assumption of a change in data type. Both operators expect the data at the same time but doing operations that are conflicting in nature due to the difference of data types. The flow is followed by a conversion to the original data type through an operator 3008 and both branches 3003 and 3004 are joined through operator 3009 with a conflict on the data operations carried out at operator 3006 and operator 3007. The data is finally stored at operator 3010. The depiction of the synchronization problem can take place at two different branches or multiple branches. The synchronization of machine learning workflows is represented by operators doing conflicting operations when placed on execution matrix 24 and assigned its execution slot 25 in the same column.

Figure 16:
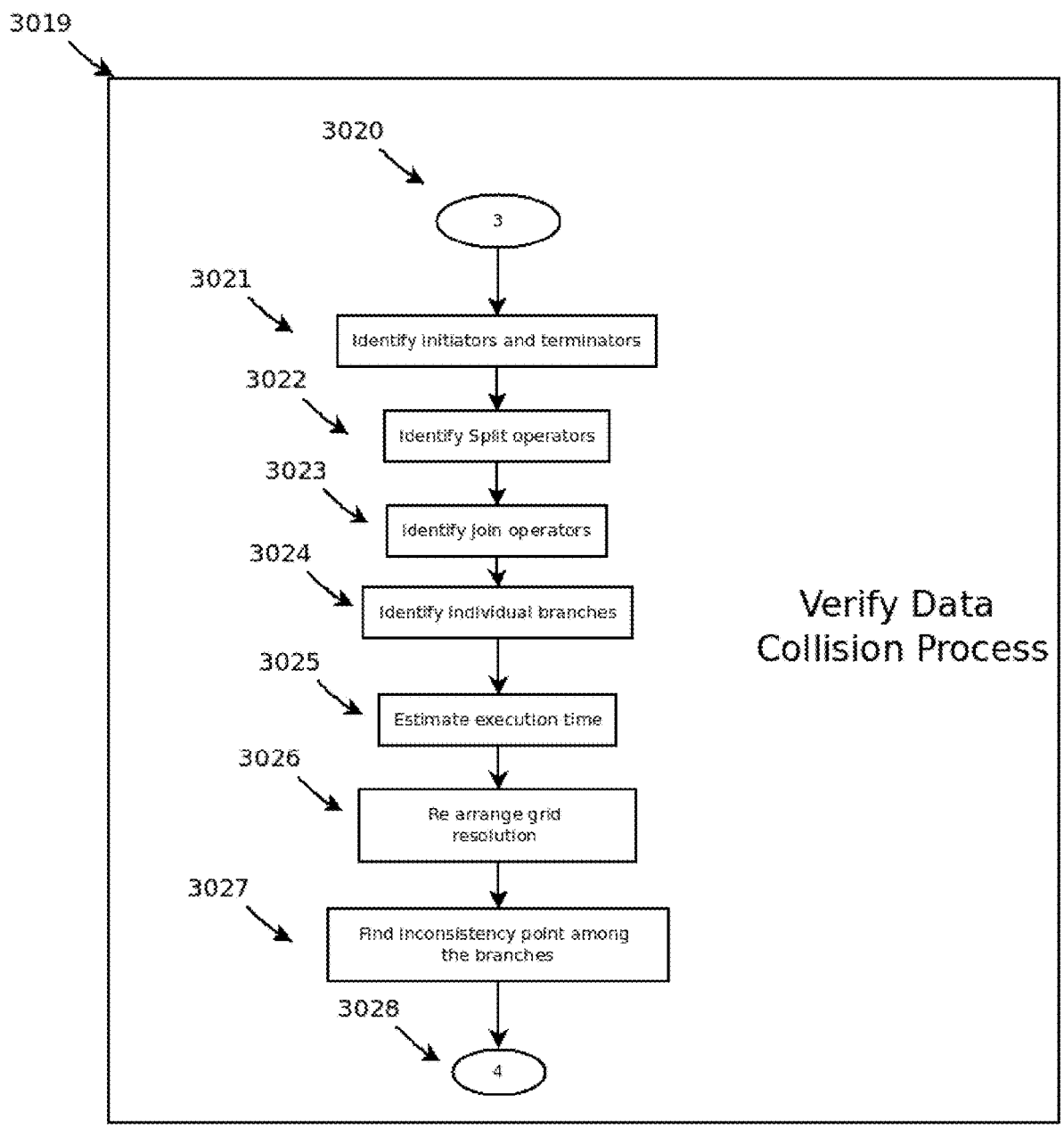
FIG. 16 shows the process to verify synchronization data collisions and redundant operators in a workflow according to the teachings of the present invention.

FIG. 16 presents a flowchart of a process to verify synchronization data collisions and redundant operators in a workflow. A flowchart 3019 contains the details to carry out step 2004 and step 2005. The flowchart starts with a continuation symbol 3020 that connects to continuation symbol 2083. Continuation symbol 3020 is followed by a step 3021 that identifies initiators and terminators. Step 3021 is followed by a step 3022 that identifies the split operators. The split operator identification is followed by a step 3023 that detects the join operators. A step 3024 identifies the individual branches by matching the split and the join operators to get the individual branches of the flows in a step 3024. The whole workflow at this point is already in execution matrix 24 and each operator to its assigned execution slot 25.

The execution matrix 24 and information about the operators and data from database table 69, database table 72 and database table 77 are utilized in a step 3025 to estimate the execution time of the flow. A step 3026 is used when the information from execution matrix 24, database table 69, database table 72 and database table 77 has enough information where the grid resolution can be adjusted to include columns in the execution matrix 24 that span time intervals during the execution of operators within a single column of execution matrix 24. A step 3027 scans the different branches to find inconsistencies among different branches in a similar fashion as flowchart 2050. The step 3027 is followed by a symbol 3028 representing the continuation of the flowchart.

Figure 17:
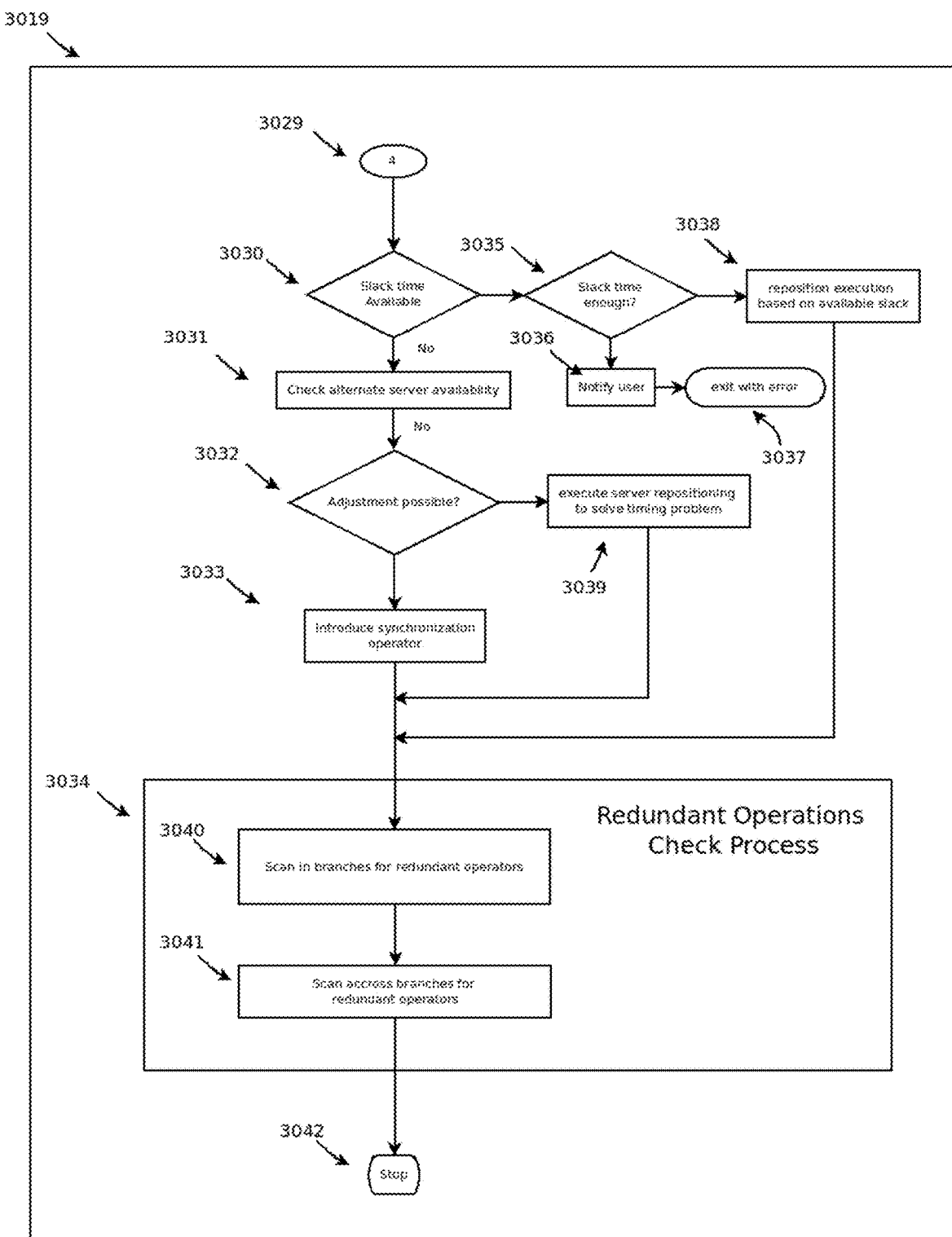
FIG. 17 shows the continuation of the process depicted in FIG. 16.

FIG. 17 presents the continuation of the flowchart for the process to verify synchronization data collisions and redundant operators. A symbol 3029 represents the continuation of symbol 3028. Symbol 3029 is followed by a step 3030 which is a determination of whether an execution slack, as shown and discussed in FIG. 3a, is available. If the determination in step 3030 is negative the process will search for executing the flows on different servers to try to execute the process at different execution speeds to solve the synchronization problem. A step 3032 makes the decision to see if the server configuration is feasible. If the decision of step 3032 is negative a step 3033 introduces a synchronization operator which is inserted on one of the conflicting branches to stop the execution for a period of time and then resume after the synchronization problem is done and resume operations afterwards. The step 3033 is followed by a processing block 3034 for redundant operations check process. If the decision of step 3030 is positive, then a step 3035 verifies if the slack time is enough to solve the synchronization problem.

If the slack time is not enough then a step 3036 notifies the user and exits with an error in step 3037. If the decision in step 3035 is positive, then a step 3038 repositions the operators based on the available slack to avoid the synchronization problem and proceeds to processing block 3034 for redundant operations check process. If the decision of step 3032 is positive, then a step 3039 executes the server repositioning to avoid the synchronization problem and proceeds to processing block 3034 for redundant operations check process. Processing block 3034 consists of a step 3040 that scans branches for repeated operators with the same configuration targeting the same data and a step 3041 which scans across branches for repeated operators with the same configuration targeting the same data. Step 3041 goes to a step 3042 that finishes the process.

The invention claimed is:

1. A computer-implemented method for automatically verifying data collisions in a computer-implemented machine learning workflow model, wherein said computer-implemented machine learning workflow model comprises a plurality of operators configured in a coordinate grid, wherein said plurality of operators are defined by information a plurality of databases, comprising the steps of:

a plurality of computer servers making up a system for executing an application interface that provides a user a graphical representation of a transactional workflow, wherein said application interface contains a canvas graphical representation where one or more specific functionality icons representing operators are placed on said canvas, with each said icon being connected together by a link;

wherein said functionality icons reference the configuration that said system will execute;

using at least one server;

using at least one memory module to execute said transactional workflow;

accessing at least one database, said database storing a plurality of operators;

marking within said workflow representation operators of the plurality of operators that function as a split or branching process utilizing said at least one database, wherein said split of branching process operators determine the beginning of a branch that can contains one or more inconsistency points within said branch;

marking within said workflow representation operators that function as join process utilizing said at least one database, wherein said split or branching process operators determine the ending of a branch that can contain one or more inconsistency points within said branch;

isolating a plurality of branches from said workflow by matching each of said identified split operators with its corresponding identified join operators;

estimating an execution time of said workflow, based on the configuration of said workflow on said coordinate grid and databases;

scanning, in each branch of said plurality of branches, for inconsistencies between operators wherein said inconsistency indicate data collision or redundant operators;

wherein an execution manager produces the execution map of said transaction workflow, which is divided into columns and rows within an X-Y coordinate grid, with a respective grid location execution slot for an execution task representing a specific task;

placing within said X-Y coordinate grid a segmented vertical line and a segmented horizontal line into a cell to determine if a vertical slack or a horizontal slack is present in the coordinate grid that will be used by a controller to coordinate the execution with an execution engine on a computer system and determine data collisions and redundant operators;

wherein the execution manager verifies the synchronization data collisions and redundant operators and determines whether any execution slack time is available and how much is it by accomplishing one of the following steps:

when said execution slack time is available and enough, said execution manager repositions said execution based on the available slack time;

when said execution slack time is available but not enough, said execution manager notifies the user and exits, indicating an error;

when said execution manager determines that said execution slack is not available, it checks for alternate server(s) availability to validate whether executing the process at different execution speeds solves the synchronization problem and if so it executes the server repositioning as required to avoid the synchronization problem, however if even said repositioning is not enough to create sufficient execution slack, then said execution manager introduces a synchronization operator which is inserted on one of the conflicting branches to stop the execution for a period of time and then resume after the synchronization problem is done and resume operations afterwards;

wherein once the execution synchronization is adjusted, the execution manager then proceeds to scan the branches for repeated operators having the same configuration targeting the same data; and said execution manager also scans across branches for repeated operators with the same configuration targeting the same data.

2. The method of claim 1, where modifying said coordinate grid resolution comprises including at least one empty column to said coordinate grid.

3. The method of claim 1, further comprising:
the steps of scanning said plurality of branches for repeated operators within the same branch, and scanning said plurality of branches for repeated operators within different branches.

\* \* \* \* \*